United States Patent
DuBois

[19]

[11] Patent Number: 6,018,901
[45] Date of Patent: Feb. 1, 2000

[54] FISHING LURE WITH SPINNER DEVICE

[75] Inventor: Eugene J. DuBois, Baker, La.

[73] Assignee: Bass Pro Trademarks, L.P., Springfield, Mo.

[21] Appl. No.: 09/164,180

[22] Filed: Sep. 30, 1998

[51] Int. Cl.[7] .................................................. A01K 85/10
[52] U.S. Cl. ...................... 43/42.19; 43/42.13; 43/42.2; 43/42.32
[58] Field of Search ..................... 43/42.11, 42.13, 43/42.19, 42.2, 42.32; D22/125, 126, 129–133

[56] References Cited

U.S. PATENT DOCUMENTS

| | | | |
|---|---|---|---|
| D. 231,526 | 4/1974 | Newman, Jr. | D22/129 |
| 295,350 | 3/1884 | Chapman | 43/42.2 |
| 323,111 | 7/1885 | Chapman | 43/42.32 |
| 644,911 | 3/1900 | Hedgeland | 43/42.32 |
| 830,404 | 9/1906 | Barnes | 43/42.32 |
| 1,002,785 | 9/1911 | Telford | 43/42.2 |
| 1,682,710 | 8/1928 | Pflueger | 43/42.13 |
| 1,820,887 | 8/1931 | Pflueger | 43/42.13 |
| 2,139,424 | 12/1938 | Simon | 43/42.06 |
| 2,214,668 | 9/1940 | Erickson | 43/42.08 |
| 2,911,751 | 11/1959 | Mason | 43/42.06 |
| 3,380,185 | 4/1968 | Jensen | 43/42.11 |
| 3,533,183 | 10/1970 | Treaster | 43/42.32 |
| 4,416,080 | 11/1983 | Morrissette | 43/42.2 |
| 4,501,086 | 2/1985 | Bunce | 43/42.2 |
| 4,617,753 | 10/1986 | Pauley et al. | 43/42.19 |
| 4,637,158 | 1/1987 | Reid | 43/42.19 |
| 4,653,218 | 3/1987 | Margulis | 43/42.2 |
| 4,864,765 | 9/1989 | Vanderplow | 43/42.19 |
| 5,076,005 | 12/1991 | Rosek | 43/42.14 |
| 5,133,147 | 7/1992 | Benard | 43/42.13 |
| 5,303,497 | 4/1994 | Rabideau | 43/42.19 |
| 5,381,621 | 1/1995 | Fuller | 43/42.13 |

*Primary Examiner*—Michael J. Carone
*Assistant Examiner*—Darren W. Ark
*Attorney, Agent, or Firm*—Shook, Hardy & Bacon, L.L.P.

[57] ABSTRACT

A fishing lure having an elongate rotary tube member for rotation about a wire harness is provided. The wire harness is generally v-shaped with first and second wires. The first wire rotatably receives an elongate rotary tube member having a longitudinal bore therethrough. A spinner blade is coupled with the rotary tube member via a clevis to rotate the rotary tube member about the wire harness as the lure is drawn through water. The second wire receives a lure body and a hook.

12 Claims, 1 Drawing Sheet

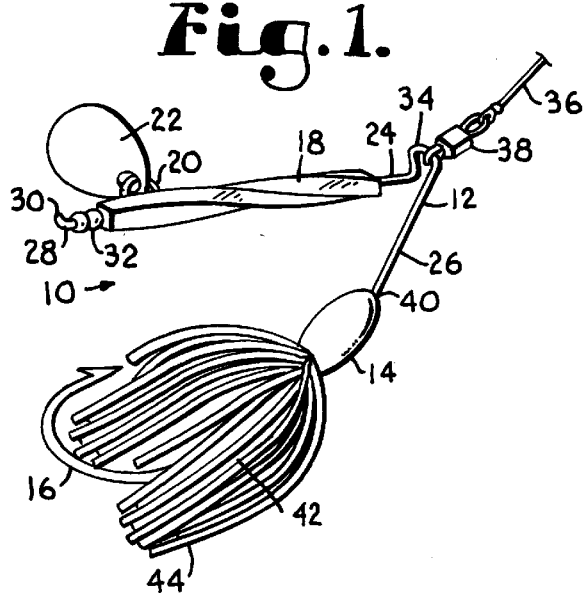
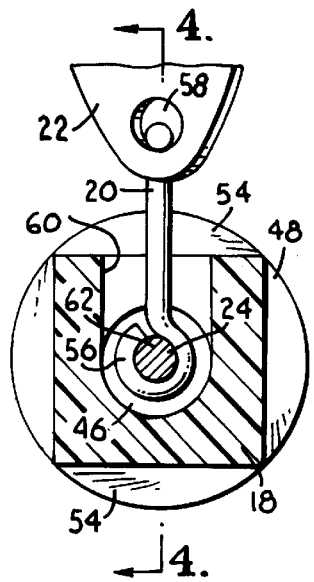
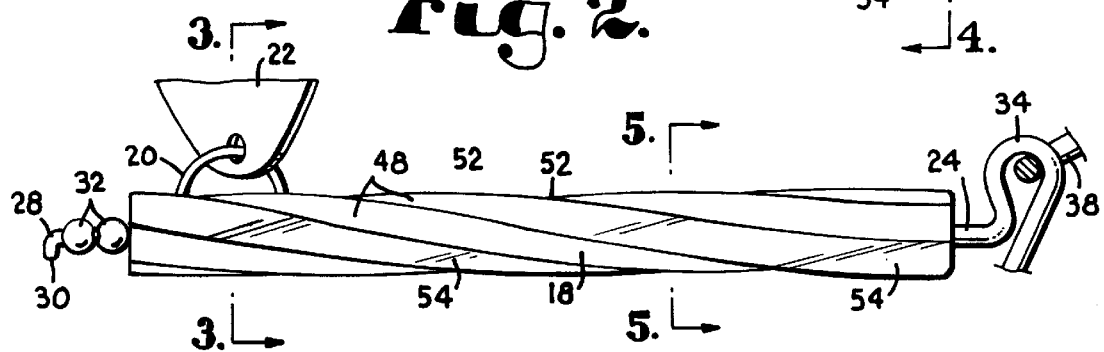
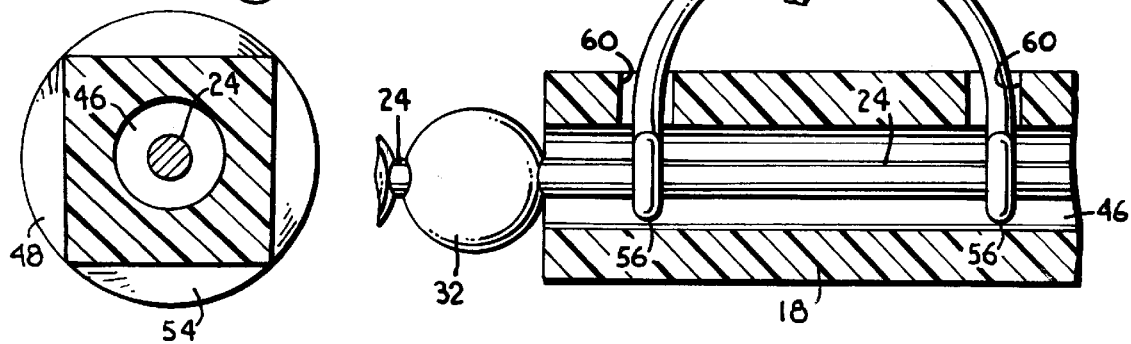

FISHING LURE WITH SPINNER DEVICE

FIELD OF THE INVENTION

The present invention relates to a fishing lure with a spinner device. More particularly, this invention relates to a fishing lure having a wire harness with an elongate rotatable tube member thereon which, when the lure is pulled through water, rotates about the wire harness and thereby attracts fish.

BACKGROUND OF THE INVENTION

People have attempted to catch fish by using fishing lures for hundreds years. Over this period of time, many improvements have been made on lures that have made them more attractive to fish, thereby increasing the chances that a given fishing expedition will be more successful. Some of these improvements have included adding bright colors to lures, adding sounds to lures, adding smells to lures, and adding items to the lures which move about as the lure is drawn through the water. The objective of all of these improvements is to attract the attention of a fish to the lure and to thereby convince the fish that the lure is a live animal and a tasty meal.

One device that has been used on fishing lures that has met with great success is a spinner. This device is usually a tear dropped shaped metal blade that has a concave portion. This blade is attached to a wire harness of a fishing lure somewhere away from the lure's body. As the lure is drawn through the water, the blade rotates about the wire harness. This rotating motion is thought to attract fish in several ways.

First, spinners are thought to attract fish visually. Spinner blades are generally silver in color and are of a highly polished metal having mirror-like reflective qualities. The rotating blade reflects normally vertical light rays into a horizontal orientation. This catches the eye of fish and causes the lure to stand out in even murky surroundings. Additionally, the rotating spinner blade adds additional movement to the lure. Without the spinner blade, the lure primarily only has movement in one direction, i.e., laterally toward the fishing rod. The spinner, however, rotates in a direction perpendicular to the normal line of travel. This additional movement causes the lure to have a more realistic and lifelike appearance.

The second way that a spinner is thought to attract fish is by creating sound. As the spinner blade rotates about the wire harness and through the water, the friction between the blade and the water, along with the contact of the blade and the lure, create a high pitched "whirl" that can be detected by fish.

Similar to the production of sound waves which can be received by fish, the spinner blade is also thought to attract fish by producing an underwater disturbance which is sent out in the form of "shock" waves or "disturbance" waves. Because most of the food eaten by fish are live animals which move about, fish are well adapted to detect the disturbance waves produced by small movements under water.

One draw back of the prior art method of spinners is that grass, moss or other water vegetation can become tangled about the spinner blade of the lure and thereby prevent it from rotating about the wire harness. As lures are commonly drawn through such types of vegetation, the effectiveness of spinner lures is often reduced in such surroundings thereby decreasing the benefit provided by spinners.

While this common embodiment has proven to be somewhat successful in attracting fish to the lure, there is a need for a lure which provides a more realistic and lifelike appearance, which produces altered and enhanced sound waves, which produces altered and enhanced disturbance waves, and which is less likely to become clogged during use. The present invention overcomes the draw backs of the prior art and fulfills these and other needs.

SUMMARY OF THE INVENTION

It is a general object of the present invention to provide a spinner fishing lure which includes a rotary tube member that has multiple helical surfaces with alternating light reflecting material placed thereon to produce a unique swimming appearance which was heretofore unknown.

A further object of the present invention is to provide a spinner fishing lure which includes a rotary tube member that rotates with a spinner blade to produce a unique sound when pulled through water.

It is an object of the present invention to provide a spinner fishing lure which includes a rotary tube member that rotates with a spinner blade to thereby alter the disturbance waves that are produced during use and to enhance the magnitude of the resulting altered waves.

Another object of the present invention is to provide a spinner fishing lure which includes a rotary tube member that covers the ends of a clevis where they attach to the wire harness of the lure to thereby shield the ends from vegetation and thereby produce a lure which is less likely to become inoperative when drawn through vegetation found in water.

In order to overcome the above-stated problems and limitations and to achieve the noted objects there is provided a spinner fishing lure having a elongate rotary tube member which is adapted to prevent vegetation from clogging the spinner. In general, the fishing lure comprises a wire harness, a lure body, a hook, a rotary tube member, a clevis, and a spinner blade. In the preferred form, the rotary tube member has an elongate portion, a longitudinal bore therethrough and has multiple helical shaped outer surfaces. A spinner blade, coupled with the rotary tube member via a clevis causes the member to rotate about the wire harness when the lure is pulled through the water.

Further objects, features, and advantages of the present invention over the prior art will become apparent from the detailed description of the drawings which follows, when considered with the attached figures.

DESCRIPTION OF THE DRAWINGS

The objects and features of the invention noted above are explained in more detail with reference to the drawings, in which like reference numerals denote like elements, and in which:

FIG. 1 is a perspective view of the preferred embodiment of the fishing lure of the present invention;

FIG. 2 is an enlarged cut-a-way view of the rotary tube member of the present invention;

FIG. 3 is a vertical cross-sectional view of the rotary tube member of the present invention taken generally along the line 3—3 of FIG. 2;

FIG. 4 is a fragmentary vertical cross-sectional view of the present invention showing the attachment of the clevis to the wire harness as taken generally along with line 4—4 of FIG. 3.

FIG. 5 is a vertical cross-sectional view of the rotary tube member of the present invention taken generally along the line 5—5 of FIG. 2.

DETAILED DESCRIPTION OF THE PREFERRED EMBODIMENTS

Referring now to the drawings in detail and initially to FIG. 1, the numeral 10 generally designates the preferred embodiment of a spinner fishing lure constructed in accordance with the present invention. Lure 10 is preferably comprised of a wire harness 12, a lure body 14, a hook 16, a rotary tube member 18, a clevis 20, and a spinner blade 22.

The wire harness 12 is generally v-shaped, having a first wire 24 and a second wire 26. The wire harness 12, as depicted in FIG. 1, preferably contains three bends. The first bend 28 is at a distal end 30 of the first wire and is a simple right angle bend. The purpose of the first bend 28 is to keep the rotary tube member 18 and any accompanying beads 32 on the wire harness 12 during use. Other methods of keeping the objects on the wire harness 12 during use are contemplated; however, the first bend 28 has been found satisfactory, easy and of low cost.

A second bend 34 in the wire harness 12 is located approximately at the middle of the wire harness and forms the base of the v-shape where the first wire 24 and the second wire 26 meet. The second bend 34 provides a looped portion in the wire harness 12 where a fishing line 36 may be attached to the lure 10 directly or through the use of a swivel 38.

A third bend 40 is located near a distal end (not pictured, located within the lure body 14) of the second wire 26 of the wire harness 12. As illustrated in FIG. 1, the third bend 40 is located at a point where the second wire 26 enters the lure body 14. This third bend 40 biases the lure body 12 towards the rotary tube member 18.

The lure body 14 is preferably a hard plastic unit which has been molded around the second wire 26 of the wire harness 12. The lure body 14 also includes a skirt 42. The skirt 42 is made up of a plurality of flexible elongate rubber strips 44 which wave in the water as the lure 10 is reeled in.

The hook 16 is preferably also cast partially within the lure body 14 and is opposite the second wire 26 of the wire harness 12. The hook 16 is partially concealed within the skirt 42 of the lure body 14.

The rotary tube member 18, as best shown in FIG. 2, is preferably elongate in shape. Additionally, and as illustrated in FIGS. 3, 4, and 5, the member 18 has a longitudinal bore 46 therethrough. Bore 46 is adapted to rotatable receive a portion of the wire harness 12. Preferably, the rotary tube member is located on is on the first leg 24. While the rotary tube member 18 can be of many different shapes, the preferable shape, as best depicted in FIG. 2, has multiple helical surfaces 48 thereon.

FIG. 5 shows that the cross-section of member 18 is a square and that the multiple helical surfaces 48 were formed by twisting or rotating an elongate rod with a square cross-section about its longitudinal axis. While the member 18 illustrated in the drawings has four helical surfaces, it is within the scope of the present invention to increase or decrease the number of helical faces by altering the cross-section of the initial, untwisted rod.

The multiple helical surfaces 48 on the rotary tube member 18, provide a unique appearance to the lure 10. This unique appearance facilitates the attracting of fish as the rotary tube member 18 rotates about the first wire 24 of the wire harness 12. Unlike a spinner blade by itself, which only adds movement to a lure in an arc perpendicular to the wire harness it rotates about, the multiple helical surfaces 48 of the member 18 also add the appearance of forward or backward movement (depending on whether the member 18 is rotating clockwise or counter-clockwise) along with a waving up and down motion.

The appearance of movement in these additional directions is a direct result of the multiple helical surfaces. The additional forward or backward motion is caused by the broadest part of any one of the surfaces, when looking at the member 18 from the side as illustrated in FIG. 2, moving to the right or left as the member rotates. This is analogous to a barber's pole in a horizontal position. As the pole is rotated, the lines appear to move in one direction.

The appearance of a waving up and down motion is caused by the highest point (and lowest point), as viewed again from the side as illustrated in FIG. 2, at any given vertical cross-section moving up and down as the member 18 rotates. In other words, when viewed from the side, the member 18 has peaks 50 and valleys 52. As illustrated, a peak 50 is currently located along the line 5—5. As the member 18 is rotated in a clockwise direction (when looking in the direction of the arrows on line 5—5), peak 50 will move to the right and valley 52 will soon be on the line 5—5. This means that the highest point (and lowest point on the bottom side) of the member 18 on line 5—5 moves up and down as the member 18 rotates about the first wire 24 thereby giving the member the appearance that it is waving up and down in a lifelike swimming motion.

It has additionally been found beneficial to apply light reflecting material 54 to alternating helical surfaces 48 of the member 18. The addition of alternating light reflecting material enhances the lure's ability to attract to attract fish visually. The alternating light/dark pattern furthers the appearance that the rotary tube member is not simply rotating about an axis but is waving or swimming up and down as the lure 10 is drawn through the water. This unique action has been found to be highly attractive to fish.

Lastly, the rotating multiple helical surfaces 48 of the member 18 produce a unique underwater disturbance wave. This unique disturbance wave coupled with the standard disturbance wave produced by the spinner 22 produces an overall disturbance wave of a greater magnitude than prior art devices.

To facilitate the rotation of the rotary tube member 18, the spinner blade 22 has been provided. The spinner blade 22 is preferably coupled with the member 18 via clevis 20. The clevis 20 may be a folding type, as pictured in FIG. 3, or a stirrup type (where the broader part at the ends 56 is formed by flattening the wire that forms the clevis). The spinner blade 22 is placed on the clevis by inserting one of the ends 56 of the clevis through a hole 58 in the spinner blade 22. The ends 56 of the clevis are then inserted into mating holes 60 located in the rotary tube member 18. The mating holes 60 of the rotary tube member 18 are orientated radially outward from the longitudinal bore 46. Once the ends 56 of the clevis 20 are located within the longitudinal bore 46, the rotary tube member 18 and clevis 20 combination is received on the first wire 24 of the wire harness. The clevis 20 is thereby attached to the wire harness 12 by virtue of the first wire 24 going through the holes 62 located in the ends 56 of the clevis 20.

As best illustrated in FIG. 2, it has been found preferable to include beads 32 on the first wire 24 to act as a bushing between the rotary tube member 18 and the first bend 28 of the wire harness 12. The beads 22 acts to prevent the rotary tube member 18 from getting caught on the distal end 30 of the first wire 24. Beads 32 could also be placed on the first wire 24 between the rotary tube member 18 and the second bend 34.

The spinner blade 22 can be of any type which is capable of causing the rotary tube member 18 and clevis 20 combination to rotate about the first wire 24 when drawn through water. It should be noted that while one could attach the spinner blade 22 directly to the rotary tube member 18, without the use of the clevis 20; however, it has been found beneficial to arrange the combination in the manner previously described for the reasons below.

The use of the combination of the spinner blade 22 and the clevis 22 to rotate the rotary tube member 18 about the first wire 24 acts to prevent the rotary tube member 18 from becoming entangled with moss or other water vegetation. In the prior art, when a spinner blade and clevis combination are used, the ends of the clevis are left open to the surroundings. In other words, the ends are not covered or protected from vegetation by anything. As the lure is drawn through vegetation, the vegetation becomes wrapped around the wire harness and entangles the clevis, thereby preventing the clevis from rotating about the wire harness. On the other hand, the present invention, through the use of the rotary tube member 18, covers the ends 56 of the clevis 20 where they attach to the wire harness 12. The rotary tube member 18 thereby seals the ends 56 of the clevis 20 from vegetation thereby reducing the possibility that the rotary tube member 18 will become entangled and fail to rotate about the wire harness 12.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

I claim:

1. A spinner fishing lure comprising:
   a wire harness;
   a lure body connected to said wire harness;
   a rotary tube member having an elongate portion with a longitudinal bore therethrough, said bore adapted to rotatably receive a portion of said wire harness;
   a spinner blade coupled with said rotary tube member to facilitate rotation of said member about said wire harness; and
   a clevis having its ends rotatably attached to said wire harness, at least a portion of said clevis extending through said member for rotation therewith about said wire harness.

2. The fishing lure of claim 1, wherein said wire harness has a first wire and a second wire, said lure body is connected to said second wire, and said rotary tube member and said clevis are received on said first wire.

3. The fishing lure of claim 2, wherein said spinner blade is coupled with said clevis.

4. The fishing lure of claim 3, wherein said wire harness is generally V-shaped and wherein the relationship between said first wire and said second wire is defined by an angle in the range of 50–85°.

5. The fishing lure of claim 2, wherein said rotary tube member has a shape which is defined by multiple helical surfaces.

6. The fishing lure of claim 1, wherein said rotary tube member has a shape which is defined by multiple helical surfaces.

7. The fishing lure of claim 6, wherein alternating helical surfaces of said rotary tube member are provided with light reflecting material.

8. A fishing lure comprising:
   a generally V-shaped wire harness having a first wire and a second wire;
   a hook coupled with said second wire of said harness;
   a lure body located on said second wire of said harness;
   a rotary tube member having a generally elongate portion having two ends and a longitudinal thru bore, said bore being adapted to receive a portion of said first wire whereby said rotary tube member can rotate around said first wire;
   a clevis, at least one leg of said clevis extending through a portion of said rotary tube member, the ends of said clevis being rotatably connected to said first wire of said harness; and
   a spinner blade coupled with said clevis whereby said spinner blade causes said clevis to rotate around said first wire thereby rotating said rotary tube member about said first wire and thereby attracting fish.

9. The fishing lure of claim 8, wherein both of the legs of said clevis pass through said rotary tube member prior to connecting to said first wire at the ends of the legs.

10. The fishing lure of claim 8, wherein the shape of said rotary tube member is defined by multiple helical surfaces.

11. The fishing lure of claim 10, wherein alternating helical surfaces of said rotary tube member are provided with light reflecting material.

12. The fishing lure of claim 8, wherein said second wire of said harness contains a bend located proximal said lure body, said bend biasing said lure body towards said first wire.

* * * * *